(12) United States Patent
Terasawa et al.

(10) Patent No.: US 6,430,878 B2
(45) Date of Patent: Aug. 13, 2002

(54) GLASS GUIDE

(75) Inventors: Takayuki Terasawa; Masahiro Nozaki, both of Aichi; Ken Yoshioka, Hamamatsu, all of (JP)

(73) Assignees: Toyoda Gosei Co., Ltd., Aichi-ken; Suzuki Motor Corporation, Hamamatsu, both of (JP)

( * ) Notice: Subject to any disclaimer, the term of this patent is extended or adjusted under 35 U.S.C. 154(b) by 0 days.

(21) Appl. No.: 09/891,181

(22) Filed: Jun. 26, 2001

(30) Foreign Application Priority Data

Jun. 26, 2000 (JP) ......................................... 2000-191222

(51) Int. Cl.⁷ .............................................. E05D 13/00
(52) U.S. Cl. ........................................... 49/416; 49/414
(58) Field of Search ........................... 49/414, 415, 419, 49/423, 428, 436, 438, 440, 441

(56) References Cited

U.S. PATENT DOCUMENTS

| 4,910,914 | A | | 3/1990 | Asoh |
| 5,524,388 | A | | 6/1996 | Chowdhury et al. |
| 5,771,637 | A | * | 6/1998 | Oikawa et al. ................ 49/414 |
| 5,943,823 | A | * | 8/1999 | Yoshida et al. ................ 49/414 |
| 6,305,125 | B1 | * | 10/2001 | Nozaki et al. ................ 49/415 |

FOREIGN PATENT DOCUMENTS

| EP | 385855 | * | 9/1990 | ................ 49/441 |
| GB | 2 309 993 | | 8/1997 | |
| JP | 8282299 | | 10/1996 | |

* cited by examiner

Primary Examiner—Jerry Redman
(74) Attorney, Agent, or Firm—Pillsbury Winthrop LLP

(57) ABSTRACT

A glass guide for guiding vertical movement of a window glass in a door panel of a vehicle. The glass guide is easily assembled with the door and prevents water from falling on a door lock device. The glass guide is mounted in the door panel at a location separated from a lower end of a glass run that is attached to a door frame of the door panel. Further, the glass guide includes a guide portion for guiding the window glass. A cover is arranged on an upper end of the guide portion. The cover includes an inclined surface, which is inclined with respect to and which intersects a lateral, vertical plane that is located at a lower end of the glass run.

20 Claims, 8 Drawing Sheets

though the invention relates to a glass guide, and more particularly, to a glass guide mounted in a door panel to guide a vertical movement of a window glass.

GLASS GUIDE

BACKGROUND OF THE INVENTION

1. Field of the Invention

The present invention relates to a glass guide, and more particularly, to a glass guide mounted in a door panel to guide a vertical movement of a window glass.

2. Description of the Related Art

Figure 12:
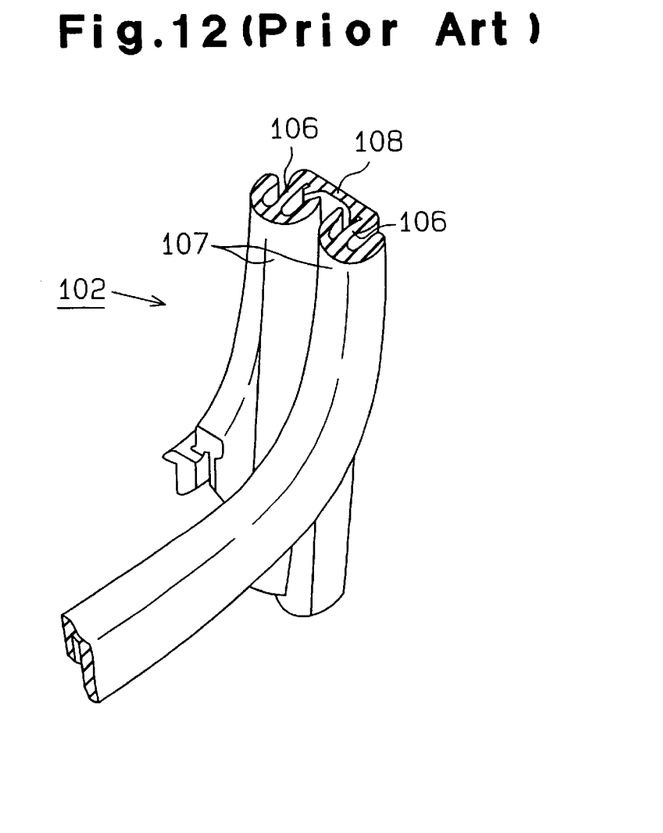
FIG. 12 is a perspective view showing a prior art glass run.
Figure 13:
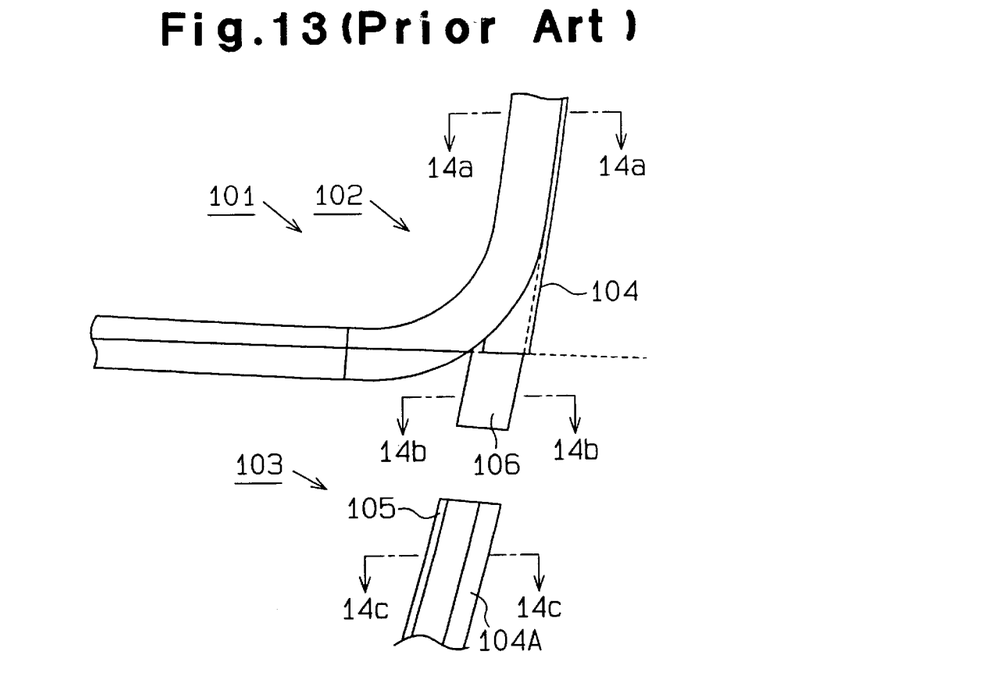
FIG. 13 is a side view showing the main portion of the prior art glass guide mechanism.
Figure 14A:
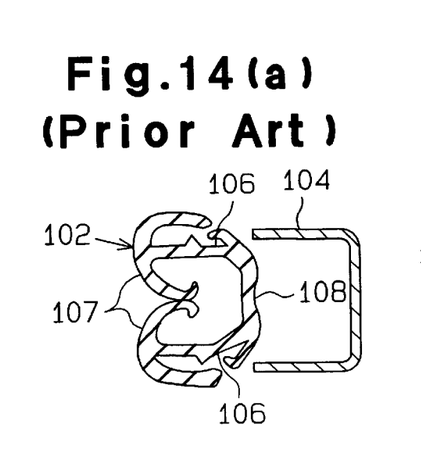
Figure 14B:
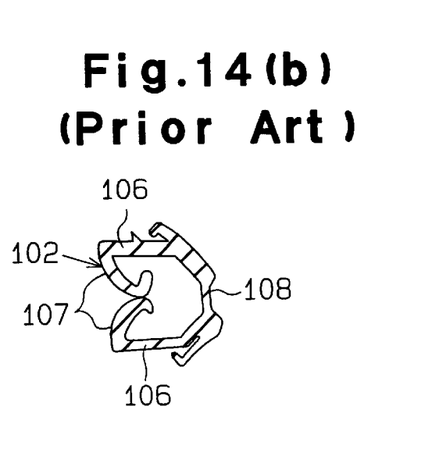
Figure 14C:
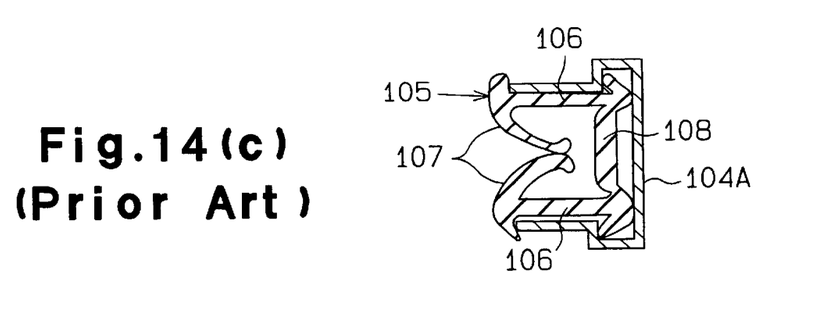

With reference to FIGS. 12, 13, 14(*a*), 14(*b*), and 14(*c*), a door panel of a vehicle includes a guide mechanism 101 for guiding the vertical movement of a door window glass. The guide mechanism 101 is divided into a glass run 102 and a glass guide 103. The glass run 102 is attached along a periphery of an inner side of a door frame 104 of the door panel. The glass guide 103 is also mounted extending along the glass run 102 in the door panel.

The glass run 102, which is made of rubber, has a main body and sealing and guiding lips. The lips guide the front and rear sides of the window glass at the peripheral portion of the window glass and seal the upper end portion of the window glass by the upper portion of the glass run 102. Further, the main body of the glass run 102 is attached in the door frame 104, which is made of metal and has a generally U-like cross-section.

The glass guide 103 includes a metal frame 104A, which has a generally U-like cross-section and is mounted in the door panel, and another rubber glass run 105, which is attached in the metal frame 104A. A main body of the glass run 105 has a generally U-like cross-section that corresponds with the shape of the bottom wall of the metal frame 104A. The glass run 105 has a bottom wall 108 and two side walls 106. A seal lip 107 extends from the distal end of each side wall 106 toward the bottom wall 108 of the main body of the glass run 105. The seal lips 107 deform elastically and pressure contact with the inner and outer surfaces of the peripheral portion of the window glass to guide the vertical movement of the window glass.

Figure 15:
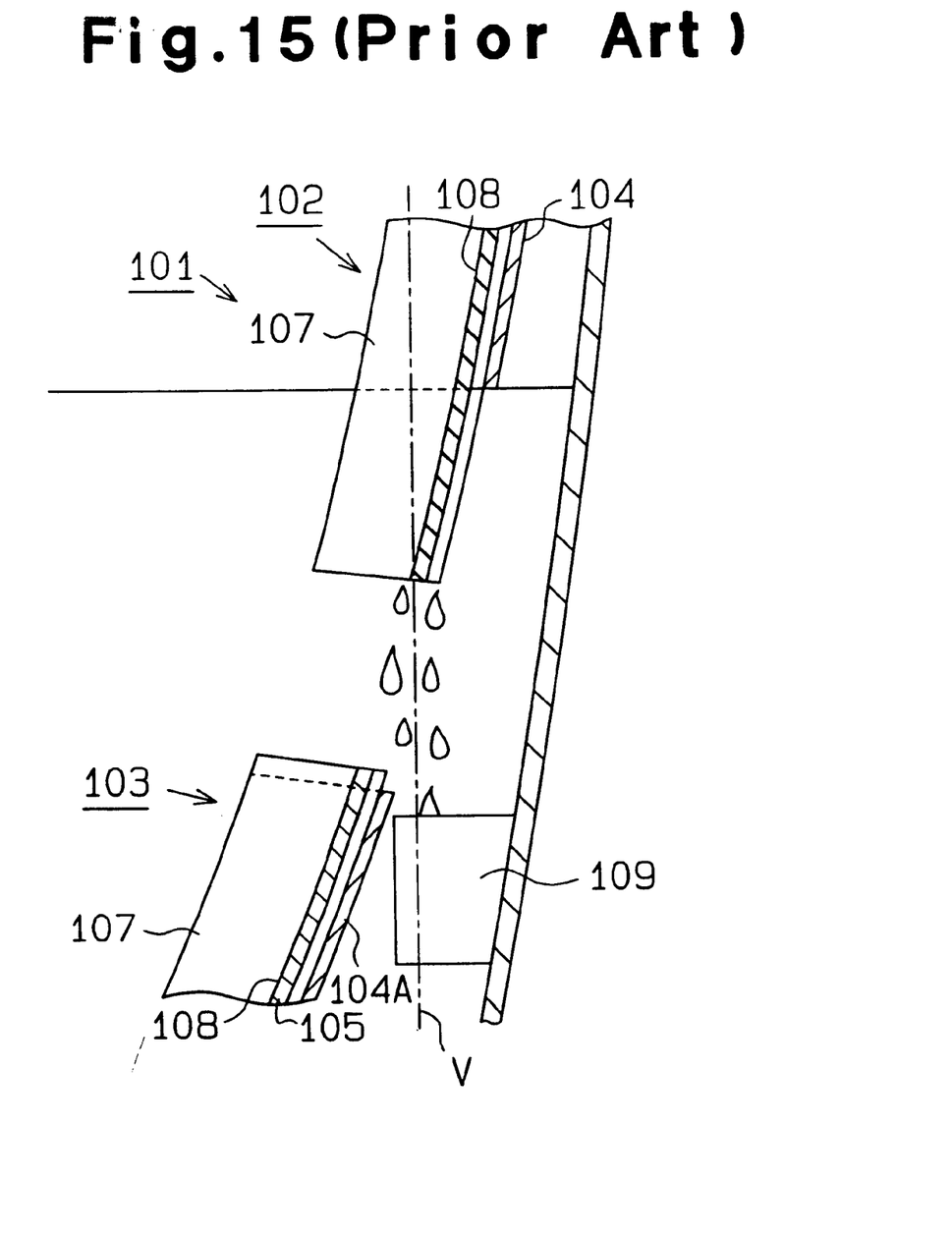
FIG. 15 is an enlarged cross-sectional view partially showing the glass guide mechanism of FIG. 13.

In the guide mechanism 101 of the related art, the glass guide 103 may not mount along vertical plane V in FIG. 15, which extends vertically from the lower end of the glass run 102. Further, a door lock device 109 may be located directly beneath the lower end of the glass run 102 in the door panel. In this case, water in the space between the window glass and the bottom wall 108 of the glass run 102 or water in the space between the glass run 102 and the door frame 104 may fall on the door lock device 109.

To solve this problem, a guide mechanism provided with a connector that connects the lower end of the glass run 102 to the upper end of the glass guide 103 has been proposed. However, in this case, the additional connector is need and would increase the weight of the guide mechanism. Further, when connecting the lower end of the glass run 102 to the upper end of the glass guide 103, the connector would have to be positioned in the door panel where the field of view is narrow. Accordingly, it would be very difficult to assemble the guide mechanism.

SUMMARY OF THE INVENTION

It is an object of the present invention to provide a glass guide mechanism that facilitates assembly, provides a light weight glass guide, and prevents water from falling on a door lock device.

To achieve the above object, the present invention provides a glass guide for guiding vertical movement of a window glass. The glass guide is mounted in a door panel of a vehicle at a location separated from a glass run that is attached to a door frame of the door panel. The glass guide includes a guide portion for guiding the window glass. A cover is arranged on an upper end of the guide portion. The cover includes an inclined surface. The inclined surface is inclined with respect to and intersects an imaginary vertical plane that is located at a lower end of the glass run.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5(*a*) is a cross-sectional view taken along line 5*a*—5*a* in FIG. 4, and FIG. 5(*b*) is a cross-sectional view taken along line 5*b*—5*b* in FIG. 4;

FIG. 14(*a*) is a cross-sectional view taken along line 14*a*—14*a* in FIG. 13, FIG. 14(*b*) is a cross-sectional view taken along line 14*b*—14*b* in FIG. 13, and FIG. 14(*c*) is a cross-sectional view taken along line 14*c*—14*c* in FIG. 13.

DETAILED DESCRIPTION OF THE PREFERRED EMBODIMENTS

A glass guide according to a first embodiment of the present invention will now be described with reference to FIGS. 1 to 6. Referring to FIG. 4, the glass guide mechanism 21 includes a glass run 22 which is disposed upper side and a glass guide 23 which is disposed lower side, respectively.

Figure 5A:
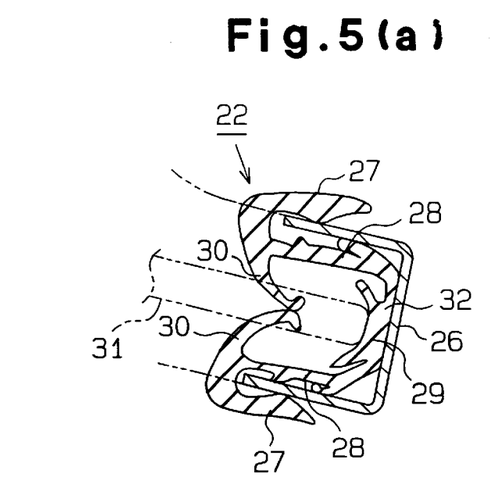

An opening 25, which is opened and closed by a window glass 31, is formed in the upper portion of the door panel 24. The glass run 22 is attached to the door panel 24 on the upper and lateral sides of the opening 25. Referring to FIG. 5(*a*), the glass run 22 is attached in a door frame 26 of the door panel 24, which is made of metal and pressed to have a generally U-like cross-section. The door frame 26 is slightly inclined relative to a vertical plane V, which extends laterally through the vehicle (see FIG. 6). That is, the door frame 26 is inclined such that the upper portion thereof is located in the rear side of the vehicle and the lower portion thereof is located in the front side of the vehicle.

The glass run 22 is formed by extruding solid rubber, such as ethylene-propylene-diene terpolymer (EPDM), so that a main body 32 of the glass run 22 has a generally U-like cross-section that corresponds to the inner surface of the door frame 26. The main body 32 of the glass run 22 has a bottom wall 29 and two side walls 28. A seal lip 30 extends from the distal end of each side wall 28 toward the bottom wall 29 of the glass run 22. The seal lips 30 deform elastically and pressure contact with the inner and outer surfaces of the peripheral portion of the window glass 31 to guide the vertical movement of the window glass 31 and prevent water from entering the passenger compartment.

A molding lip 27 extends from the distal end of each side wall 28 in a direction opposite to the direction in which the associated seal lip 30 extends. The flange portions of the door frame 26 are inserted between the side walls 28 and the associated molding lips 27 to attach the glass run 22 to the door frame 26.

Figure 4:
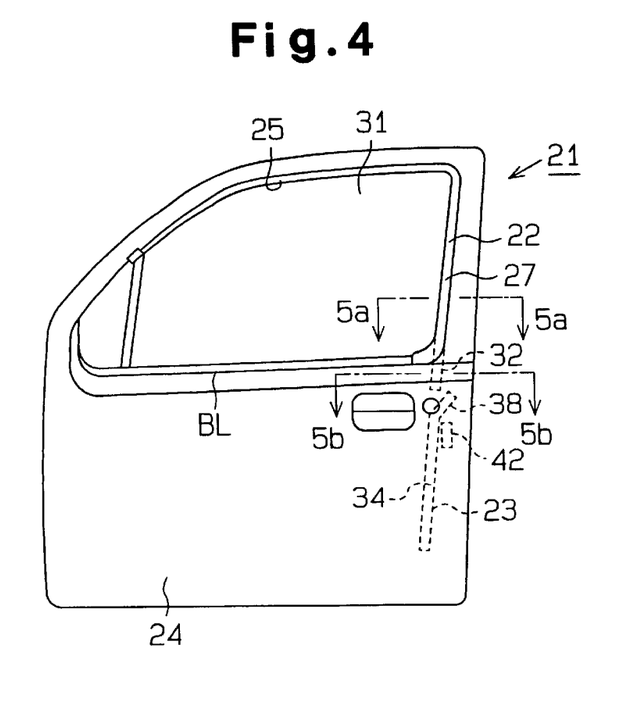
FIG. 4 is a side view showing a glass guide mechanism mounted to a door panel.
Figure 5B:
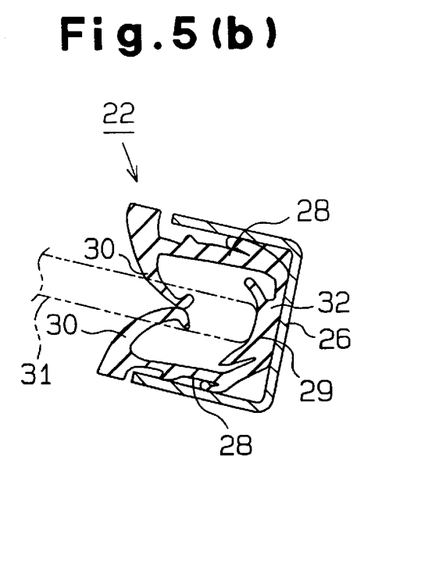
Figure 6:
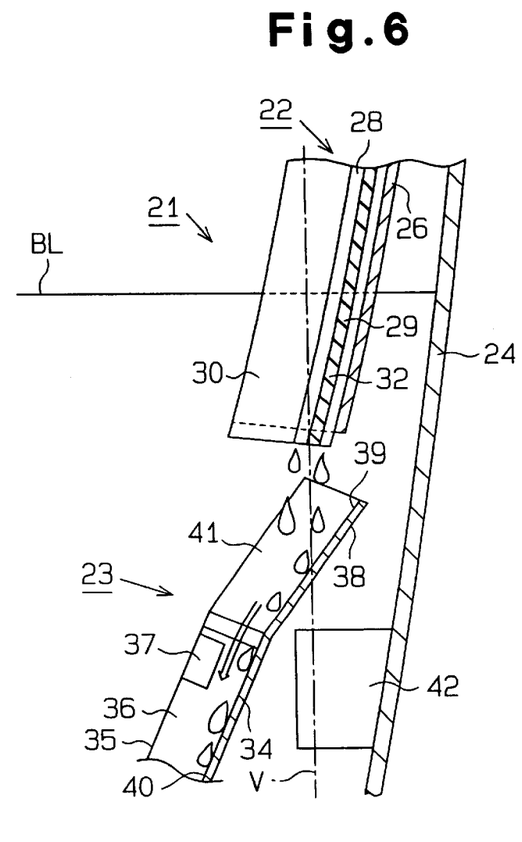
FIG. 6 is a partial enlarged cross-sectional view showing the glass guide mechanism of FIG. 4.

With reference to FIG. 5(b), the molding lip 27 is not formed below a door belt line BL (FIGS. 4 and 6). Thus, the molding lip 27 is eliminated from the main body 32, which has a generally U-shaped cross-section, of the glass run 22 below the door belt line BL.

Referring to FIG. 4, the glass guide 23 is mounted extending along the glass run 22 in the door panel 24 but is separated from the lower end of the glass run 22. The glass guide 23 is fastened to the door panel 24 with fasteners (not shown), such as screws, clips, and rivets, in a state in which the glass guide 23 is slightly inclined relative to the lateral, vertical plane V in the same manner as the door frame 26.

Figure 1:
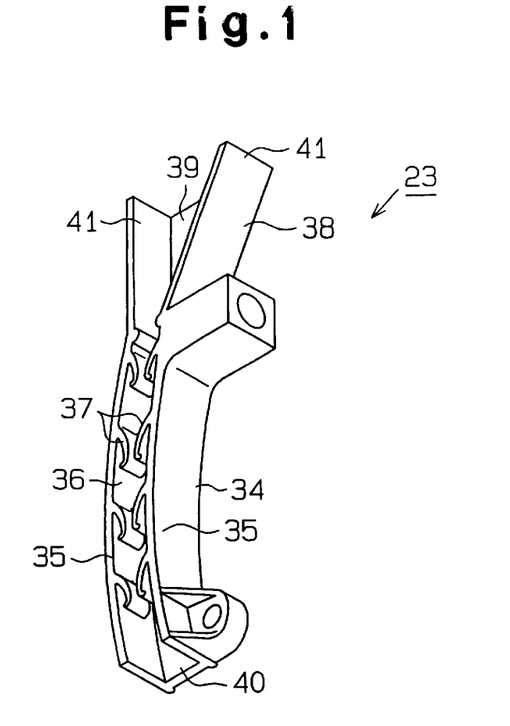
FIG. 1 is a perspective view showing a glass guide according to a first embodiment of the present invention.
Figure 2:
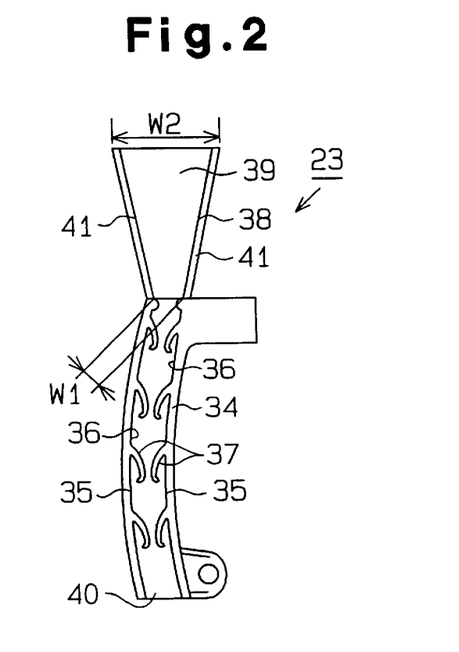
FIG. 2 is a front view showing the glass guide of FIG. 1.

With reference to FIG. 1, the glass guide 23 is formed by injection molding a resin material such as polyacetal, which has superior resistance to friction. The glass guide 23 includes a guide portion 34, which has a generally U-like cross-section. The guide portion 34 has a bottom wall 40 and two side walls 35. Pairs of guide flaps 37 (four pairs in the first embodiment) are formed on the inner surfaces 36 of the two side walls 35. Each of the guide flaps 37 extends downward and has a generally C-like cross-section.

Figure 3:
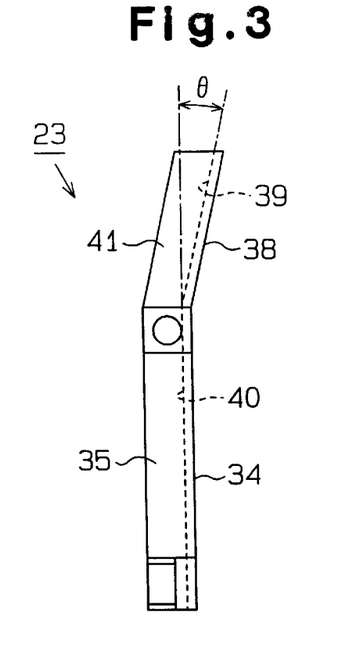
FIG. 3 is a side view showing the glass guide of FIG. 1.

As shown in FIGS. 1 to 3 and 6, a drain cover 38 is formed integrally with the upper end of the guide portion 34. The drain cover 38 has a U-like cross-section and a V-shape when viewed from the front (see FIG. 2). Further, the drain cover 38 has an inclined surface 39. The inclined surface 39 extends from the upper end of the guide portion 34 and is inclined with respect to the plane of the bottom wall 40 by angle θ (FIG. 3). Further, the inclined surface 39 intersects a vertical plane V (FIG. 6), which is located at the lower end of the glass run 22. The inclination angle θ of the inclined surface 39 relative to the bottom wall 40 of the guide portion 34 is preferably 1° to 60°, more preferably 3° to 45°, and optimally 5° to 30°. That is, the inclination angle θ is determined to ensure that the inclined surface 39 intersects the vertical plane V, that the drain cover 38 is not positioned too far to the rear, and that the inclination of the inclined surface 39 is not too gradual.

A side wall 41 extends from each side of the inclined surface 39 perpendicular to the inclined surface 39. The two side walls 41 define an opening in the drain cover 38. The width of the opening at the basal end of the drain cover 38 (W1) is most narrow. The width increases at locations closer to the distal end of the drain cover 38. Thus, the width of the opening at the distal end of the drain cover 38, (W2) is widest.

The glass guide 23 is fastened to the door panel 24 so that the drain cover 38 covers a door lock device 42. The window glass 31 passes through the basal side of the drain cover 38. Further, the guide flaps 37 deform elastically and pressure contact with the inner and outer surfaces of the window glass 31 to guide the vertical movement of the window glass.

The glass guide 23 of the first embodiment has the advantages described below.

(a) The upper portion of the glass guide 23 is inclined to the rear and includes the inclined surface 39, which intersects the vertical plane V extending from the lower end of the glass run 22. Thus, when water enters the space between the glass run 22 and the window glass 31 or the space between the glass run 22 and the door frame 26, the water falls straight down from the lower end of the glass run 22 onto the inclined surface 39. The water does not fall on the door lock device 42 and is guided from the drain cover 38 to the guide portion 34 toward the lower portion of the door panel 24. Thus, the door lock device 42 is protected from water.

When assembling the guide mechanism 21, the glass run 22 and the glass guide 23 are separately mounted to the door panel 24. Further, an additional connector for connecting the glass run 22 to the glass guide 23 is not required. Thus, the glass run 22 and the glass guide 23 do not have to be accurately positioned. This facilitates the assembly of the glass guide 23.

(b) In the glass guide 23, the opening width W2 at the distal end of the drain cover 38 is greater than the opening width W1 at the basal end of the drain cover 38. Thus, the inclined surface 39 of the drain cover 38 effectively receives the water that falls from the lower end of the glass run 22. This effectively protects the door lock device 42 from water.

(c) The side walls 41 formed on the sides of the inclined surface 39 of the drain cover 38 effectively guide the water received by the inclined surface 39 and prevents the leaking water from one of the side edges of the inclined surface 39. This further effectively protects the door lock device 42.

(d) The drain cover 38, which includes the inclined surface 39, and the guide portion 34 are formed integrally from a resin material. This simplifies the manufacture of the glass guide 23 and makes the glass guide 23 lighter.

(e) The guide flaps 37, which elastically pressure contact with the window glass 31, are formed on the opposing inner surfaces 36 of the guide portion 34. This decreases the number of components in the glass guide mechanism 21, makes the guide mechanism 21 lighter, and simplifies the manufacture of the glass guide mechanism 21.

(f) The inclination angle θ of the inclined surface 39 of the drain cover 38 relative to the bottom wall 40 of the guide portion 34 is set within a predetermined range. Thus, the inclined surface 39 intersects the vertical plane V, the drain cover 38 is not positioned too far to the rear, and the inclination of the inclined surface 39 is not too gradual. Accordingly, the water that falls from the lower end of the glass run 22 is received by the inclined surface 39 and effectively sent to the guide portion 34.

Figure 7:
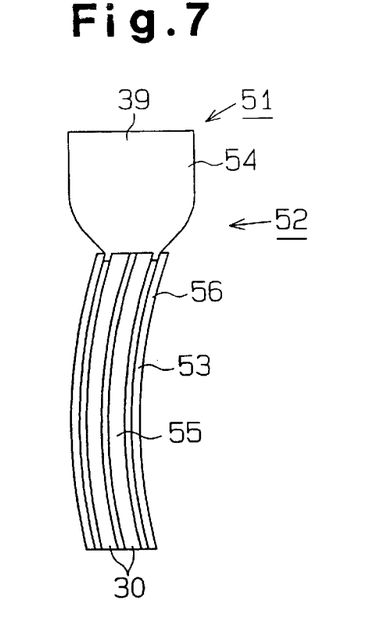
FIG. 7 is a front view showing a glass guide according to a second embodiment of the present invention.
Figure 8:
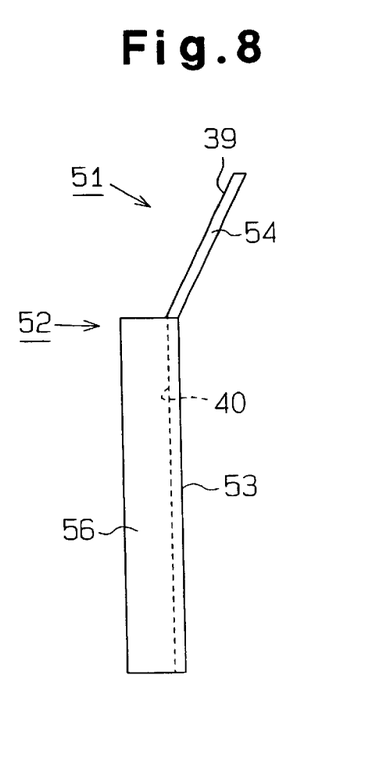
FIG. 8 is a side view showing the glass guide of FIG. 7.

With reference to FIGS. 7 and 8, a glass guide 52 according to a second embodiment of the present invention will now be discussed focusing on parts differing from the first embodiment. A glass guide mechanism 51 of the second embodiment includes the glass guide 52, which has a guide portion 53 and a glass run. The guide portion 53 includes a frame 56, which is formed by bending a metal plate, and a glass run 55, which is attached in the frame 56 and serves as a guide of the window glass 31. The glass run 55 guides the vertical movement of the window glass 31.

The glass guide 52 includes a drain cover 54 that has a flat inclined surface 39. The inclined surface 39 is defined on a metal plate formed integrally with the guide portion 53. The frame 56 and the drain cover 54 including the inclined surface 39 are given a rustproof treatment. The drain cover 54 is formed semi-oval.

The advantages of the glass guide 52 in the second embodiment will now be discussed.

(a) The glass guide 52 has the flat drain cover 54. Thus, the amount of material used to manufacture the glass guide 52 is decreased. Further, the glass guide 52 is made lighter and production costs are decreased.

(b) The drain cover 54 is formed semi-oval. Thus, the drain cover 54 that covers the door lock device 42 is wider. This ensures that the door lock device 42 is protected from water.

Figure 9:
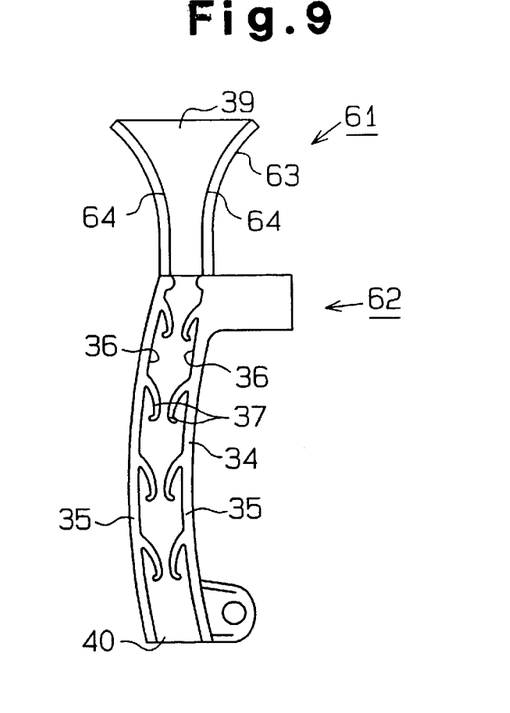
FIG. 9 is a front view showing a glass guide according to a third embodiment of the present invention.
Figure 10:
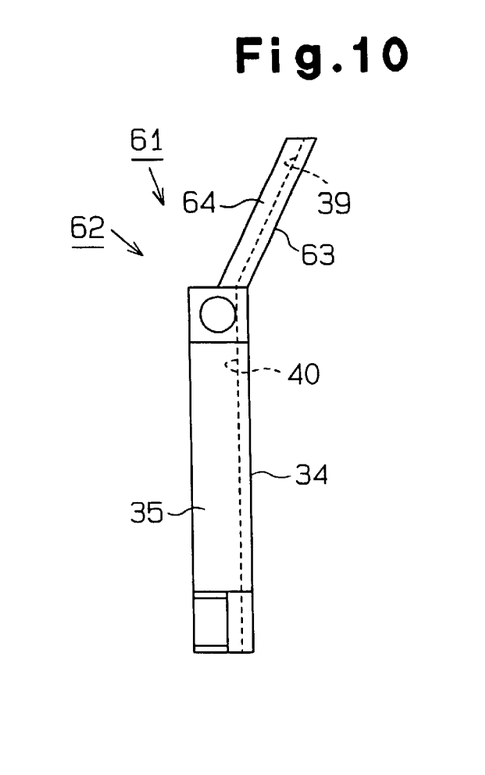
FIG. 10 is a side view showing the glass guide of FIG. 9.

A glass guide 62 according to a third embodiment of the present invention will now be discussed with reference to FIGS. 9 and 10. In a glass guide mechanism 61, a drain cover 63 of the glass guide 62 has side walls 64. Side walls 35 of guide portion 34 extend further from the bottom wall 40 than the side walls 64 extend from inclined surface 39. Further, inclined surface 39 is tapered so that the inclined surface 39 is wider at locations closer to the distal end. The two side walls 64 are formed to have a generally semi-circular shape and extend in an arcuate manner between the basal end, which is connected with the drain cover 63, and the distal end.

The advantages of the glass guide 62 in the third embodiment will now be discussed.

The side walls 64 of the drain cover 63 do not extend as far as the side walls 35 of the guide portion 34. Thus, the amount of material used to manufacture the drain cover 63 is decreased. Further, the glass guide 62 is lighter and production costs are decreased.

Figure 11:
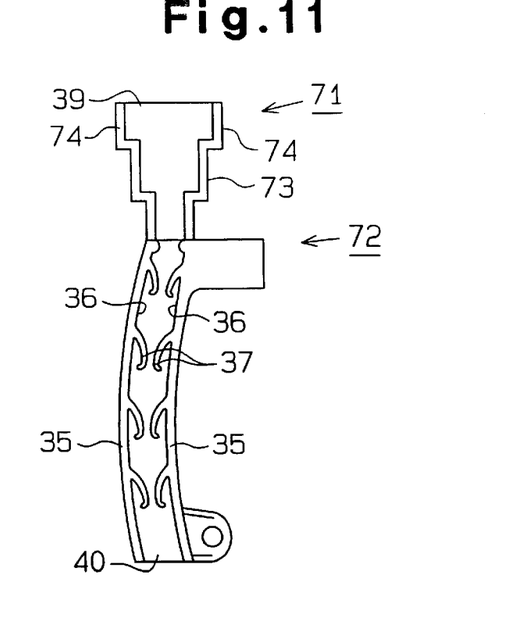
FIG. 11 is a front view showing a glass guide according to a fourth embodiment of the present invention.

A glass guide 72 according to a fourth embodiment of the present invention will now be discussed with reference to FIG. 11 focusing on the parts differing from the first embodiment. In a glass guide mechanism 71, a drain cover 73 of the glass guide 72 has side walls 74 that are formed in a stepped manner. The glass guide 72 of the fourth embodiment has the same advantages as the glass guide of the first embodiment.

It should be apparent to those skilled in the art that the present invention may be embodied in many other specific forms without departing from the spirit or scope of the invention. Particularly, it should be understood that the present invention may be embodied in the following forms.

(1) In the glass guides 23, 52, 62, 72, the guide portions 34, 53 and the drain covers 38, 54, 63, 73 may be formed separately.

(2) In the first, third, and fourth embodiments, the guide portion 34 may be formed from a resin material that differs from that of the guide flaps 37 of the glass guides 23, 62, 72. For example, the guide flaps 37 may be formed from a resin material having superior friction resistance and the guide portion 34 may be formed from a different resin material. In this case, the rigidity of the guide portion 34 may be increased depending on the selected resin material.

(3) In the glass guides 23, 62, 72 of the first, third, and fourth embodiments, a resin material layer having superior friction resistance may be applied to the surface of the guide flaps 37 and the guide portion 34 and the guide flaps 37 may be formed from a different resin material.

(4) In the first, third, and fourth embodiments, both or one of the side walls 41, 64 in each of the associated drain covers 38, 63, 73 may be eliminated.

(5) In the second embodiment, a side wall may be provided on either one or both sides of the inclined surface 39 of the drain cover 54.

(6) In the first, third, and fourth embodiments, the guide flaps 37 may be formed on only one of the side walls 35 of the guide portion 34 and the other one of the side walls 35 may be used to guide the vertical movement of the window glass 31.

The present examples and embodiments are to be considered as illustrative and not restrictive, and the invention is not to be limited to the details given herein, but may be modified within the scope and equivalence of the appended claims.

What is claimed is:

1. A glass guide for guiding vertical movement of a window glass, wherein the glass guide is mounted in a door panel of a vehicle at a location separated from a glass run that is attached to a door frame of the door panel, the glass guide comprising:

a guide portion for guiding the window glass; and a cover arranged on an upper end of the guide portion, wherein the cover includes an inclined surface, the inclined surface being inclined with respect to and intersecting an imaginary vertical plane that is located at a lower end of the glass run;

wherein the inclined surface is arranged above a door lock device mounted in the door panel to receive water that falls from the glass run and to prevent the water from falling on the door lock device.

2. The glass guide according to claim 1, wherein the inclined surface has a distal end and a basal end, and the width of the distal end is greater than that of the basal end.

3. The glass guide according to claim 2, wherein the cover has a side wall formed on at least one side of the inclined surface.

4. The glass guide according to claim 2, wherein the cover and at least part of the guide portion are formed integrally.

5. The glass guide according to claim 1, wherein at least the guide portion is made of a resin material.

6. The glass guide according to claim 5, wherein the guide portion includes:

a pair of side walls that are spaced from each other by a predetermined distance; and a guide flap formed on an inner surface of at least one of the side walls to elastically pressure contact with the window glass.

7. The glass guide according to claim 1, wherein the guide portion has a bottom wall, the inclined surface being inclined with respect to the bottom wall by an inclination angle of 1 degree to 60 degrees.

8. The glass guide according to claim 1, wherein the guide portion has a bottom wall, the inclined surface being inclined with respect to the bottom wall by an inclination angle of 3 degrees to 45 degrees.

9. The glass guide according to claim 1, wherein the guide portion has a bottom wall, the inclined surface being inclined with respect to the bottom wall by an inclination angle of 5 degrees to 30 degrees.

10. The glass guide according to claim 1, wherein the inclined surface is formed to have a generally triangular shape.

11. The glass guide according to claim 10, wherein the cover includes a side wall formed on each side of the inclined surface.

12. The glass guide according to claim 1, wherein the inclined surface is tapered so that the inclined surface is wider at locations closer to the distal end.

13. The glass guide according to claim 12, wherein the cover has a side wall formed on each side of the inclined surface.

14. A glass guide for guiding vertical movement of a window glass, wherein the glass guide is made of resin and is mounted in a door panel of a vehicle at a location separated from a lower end of a glass run that is attached to a door frame of the door panel, the glass guide comprising:

a guide portion for guiding the window glass; and a drain cover integrally formed and arranged on an upper end of the guide portion, wherein the cover includes an inclined surface having a distal end and a basal end with the width of the distal end being greater than that of the basal end, the inclined surface being inclined such that the basal end thereof is located forward of the distal end thereof relative to the vehicle, and the inclined surface intersecting an imaginary vertical plane that is located at a lower end of the glass run and receiving water that falls from the lower end of the glass run.

15. The glass guide according to claim 14, wherein the cover has a side wall formed on at least one side of the inclined surface.

16. The glass guide according to claim 14, wherein the guide portion includes:

a pair of side walls that are spaced from each other by a predetermined distance; and a guide flap formed on an inner surface of at least one of the side walls to elastically pressure contact with the window glass.

17. The glass guide according to claim 14, wherein the guide portion has a bottom wall, the inclined surface being inclined with respect to the bottom wall by an inclination angle 1 degree to 60 degrees.

18. The glass guide according to claim 14, wherein the guide portion has a bottom wall, the inclined surface being inclined with respect to the bottom wall by an inclination angle of 3 degrees to 45 degrees.

19. The glass guide according to claim 14, wherein the guide portion has a bottom wall, the inclined surface being inclined with respect to the bottom wall by an inclination angle of 5 degrees to 30 degrees.

20. The glass guide according to claim 14, wherein the inclined surface is formed to have a generally triangular shape.

* * * * *